United States Patent [19]
Arai et al.

[11] Patent Number: 5,157,658
[45] Date of Patent: Oct. 20, 1992

[54] METHOD AND APPARATUS FOR IDENTIFYING NEWLY INSTALLED MODEM IN DIAL-UP NETWORK

[75] Inventors: Kazushige Arai, Tokyo; Tatsuya Sakamoto, Shizuoka, both of Japan

[73] Assignee: NEC Corporation, Tokyo, Japan

[21] Appl. No.: 633,377

[22] Filed: Dec. 26, 1990

[30] Foreign Application Priority Data

Dec. 26, 1989 [JP] Japan .................................. 1-339700

[51] Int. Cl.$^5$ ............................ H04J 3/02; H04J 3/24
[52] U.S. Cl. .................................. 370/85.11; 370/85.8; 370/92; 340/825.07; 340/825.08; 340/825.52
[58] Field of Search ................... 370/85.8, 85.9, 85.11, 370/92, 93, 85.1, 95.2; 340/825.07, 825.08, 825.1, 825.11, 825.12, 825.13, 825.52, 825.53, 825.54

[56] References Cited

U.S. PATENT DOCUMENTS

| | | | |
|---|---|---|---|
| 3,787,627 | 1/1974 | Abramson et al. | 370/85.8 |
| 4,253,087 | 2/1981 | Saal | 340/825.52 |
| 4,510,493 | 4/1985 | Bux et al. | 340/825.52 |
| 4,638,313 | 1/1987 | Sherwood, Jr. et al. | 340/825.53 |
| 4,761,646 | 8/1988 | Choquet et al. | 340/825.52 |
| 4,825,204 | 4/1989 | Nakamura | 340/825.52 |

Primary Examiner—Benedict V. Safourek
Assistant Examiner—H. Kizou
Attorney, Agent, or Firm—Whitham & Marhoefer

[57] ABSTRACT

In order to identify a newly installed modem joining other modems which are already installed and established communications with a control unti, the newly installed modem generates, upon installation, a first logic state on an install detecting line which normally exhibits a second logic state. In response to the first logic state on the install detecting line, the control unit issues addresses which cover a predetermined maximum number of modems which can be managed by the control unit. The newly installed modem generates a reply signal in response to an address assigned thereto. The reply signal is sent to the control unit, and hence the control signal identifies the newly installed modem and is ready for establishing communication therewith.

6 Claims, 3 Drawing Sheets

METHOD AND APPARATUS FOR IDENTIFYING NEWLY INSTALLED MODEM IN DIAL-UP NETWORK

BACKGROUND OF THE INVENTION

1. Field of the Invention

The present invention relates to a method and apparatus for managing a plurality of modems in a dial-up network, and more specifically to such a method and apparatus which renders it possible to quickly and economically (in terms of time) determine which one of a plurality of modems has just been installed. The present invention is also applicable to a sub-controller which is provided for controlling a plurality of dial-up modems.

2. Description of the Prior Art

An increasing demand for dial-up (viz., switched) line network services, has required a large number of modems which are concentratedly installed in a networked terminal. It is, accordingly, of considerable importance to effectively manage such a large number of modems and to be able to determine the address at which each unit is located. The modems may be divided into a plurality of groups which are respectively controlled by corresponding sub-control units which are in turn controlled by a main control unit.

As such a dial-up terminal system includes a large number of modems and sub-control units, it is highly desirably to be able to simply and effectively identify the newly installed units via the use of a simple arrangement and method.

Before turning to the instant invention, it is deemed advantageous to discuss a known technique for ascertaining a newly installed modem with reference to FIG. 1. It should be noted that the following discussion relates to the identification of a freshly installed modem.

FIG. 1 shows an arrangement which comprises a main control unit 10, a plurality of sub-control units 12 and 14, and a plurality of modems 10a, 10b, . . . , 10n, 12a, 12b, . . . , 12n, 14a, 14b, . . . , and 14n. Each of the modems 10a–10n, 12a–12n and 14a–14n is provided with a controller which is dedicated to the identification of each unit. Each of these controllers is denoted by the reference numeral of the modem (10a–10n, 12a–12n or 14a–14b) plus a character "c".

As shown, the main control unit 10 is coupled to the sub-control units 12 and 14 via a serial clock line 20a, two serial control lines 20b and 20c. Further, the main control unit 10 is coupled to the modems 10a–10n via a serial clock line 22a, two serial control lines 22b and 22c. On the other hand, the sub-control unit 12 is coupled to the modems 12a–12n via a serial clock line 24a and two serial control lines 24b, 24c. Similarly, the sub-control unit 14 is coupled to the modems 14a–14n via a serial clock line 26a and two serial control lines 26b, 26c.

For the convenience of discussion, it is assumed that: (a) the modem 12b is newly installed and is to be identified by the sub-control unit 12, (b) the maximum number of modems which can be installed under the control of the unit 12 is 255 ($=2^8-1$) and (c) each of the modems (installed or not yet installed) is assigned an address (0 to 254 by way of example).

In accordance with a known technique the sub-control unit 12 implements polling at a predetermined time interval by transmitting an address signal via the control line 24b. More specifically, the sub-control unit 12 checks the modems 12a–12n by sequentially changing addresses assigned thereto and receives a response therefrom. The sub-control unit 12 has already identified the already located modems, and hence it can determine the newly installed one (viz., modem 12n) by checking the reply therefrom in response to the polling which has been addressed thereto.

However, the aforesaid known technique has encountered the problem in that the intermittent installation checks, which involves sending-out of all the possible addresses (viz., addresses 0 (for example) to the maximum), is very time-consuming. This problem is heightened by an increase in the maximum number of modems which can be installed. Further, if modems are not frequently installed the cyclic or intermittent checking is wasteful.

SUMMARY OF THE INVENTION

It is an object of the present invention to provide an arrangement by which a new modem or a new sub-controller can be identified without the need of intermittently addressing of all the locations allotted for modems or sub-controllers.

Another object of the present invention is to provide a method which enables a new modem or sub-controller to be identified without resort to intermittent addressing of all the locations allotted for modems or sub-controllers.

In brief, the above object is achieved by an arrangement which identifies a newly installed modem joining other modems which are already installed and established communications with a control unit. The newly installed modem generates, upon installation, a first logic state on an install detecting line which normally exhibits a second logic state. In response to the first logic state on the install detecting line, the control unit issues addresses which cover a predetermined maximum number of modems which can be managed by the control unit. The newly installed modem generates a reply signal in response to an address assigned thereto. The reply signal is sent to the control unit, and hence the control signal identifies the newly installed modem and establishes communication therewith.

More specifically a first aspect of the present invention comes in a method of identifying a first unit which is newly installed and joins a plurality of second units in a networked terminal, each of said second units having previously established a communication link with a control unit and being configured in the same manner as said first unit, said first and second units being assigned different addresses by which said first and second units are specified, said first and second units being managed by said control unit, said method comprising the steps: (a) allowing said first unit to output a first logic state on an install detecting line when said first unit is firstly installed, said install detecting line normally exhibiting a second logic state; (b) detecting said first logic state on said install detecting line at said control unit; (c) allowing said control unit, in response to the detection of said first logic state, to issue addresses which cover a predetermined maximum number of units which can be managed by said control unit; (d) allowing said first unit to generate a reply signal in response to an address assigned thereto, the reply signal being sent to said control unit; and (e) allowing said first unit to generate the second logic state by which said install detecting line restores said second logic state.

A second aspect of the present invention comes in a method of identifying a first unit which is newly installed and joins a plurality of second units in a networked terminal, each of said second units having previously establishing a communication link with a control unit and being configured in the same manner as said first unit, said first and second units being assigned different addresses by which said first and second units are specified, said first and second units being managed by said control unit, said method comprising the steps: (a) allowing said control unit to intermittently generate a global address which is transmitted to said first and second units; (b) allowing said first unit, in response to said global address, to output a first logic state on an install detecting line which normally exhibits a second logic state, said second units each ignoring said global address; (c) detecting said first logic state on said install detecting line at said control unit; (d) allowing said control unit, in response to the detection of said first logic state, to issue addresses which cover a predetermined maximum number of units which can be managed by said control unit; (e) allowing said first unit to generate a reply signal in response to an address assigned thereto, the reply signal being sent to said control unit; and (f) allowing said first unit to generate the second logic state by which said install detecting line restores said second logic state.

A third aspect of the present invention comes in a dial-up network terminal arrangement, comprising: a control unit; a plurality of modems assigned to said control unit, each of said modems having an identity controller dedicated to identifying the modem in which it is included; an install line operatively interlinking said control unit with each of the plurality of identity controllers; first means for normally applying a signal having a first logic state to said install line, said first means being provided in said control unit; second means included in each of said identity controllers for producing a signal having a second logic state and applying it to said install line in a manner which replaces the first logic state with the second logic state when initially connected to said install line; and third means included in said control unit which is responsive to the change in the logic state appearing on the install line, for issuing addresses which cover a predetermined maximum number of modems which can be interconnected with the control unit.

A fourth aspect of the present invention comes in a dial-up network terminal arrangement, comprising: a control unit; a plurality of sub-controllers assigned to said control unit, each of said sub-controllers having an identity controller dedicated to identifying the sub-controller in which it is included; an install line operatively interlinking said control unit with each of the plurality of identity controllers; first means for normally applying a signal having a first logic state to said install line, said first means being provided in said control unit; second means included in each of said identity controllers for producing a signal having a second logic state and applying it to said install line in a manner which replaces the first logic state with the second logic state when initially connected to said install line; and third means included in said control unit which is responsive to the change in the logic state appearing on the install line, for issuing addresses which cover a predetermined maximum number of sub-controllers which can be interconnected with the control unit.

A fifth aspect of the present invention comes in a dial-up network terminal arrangement, comprising: a control unit; a plurality of modems assigned to said control unit, each of said modems having an identity controller dedicated to identifying the modem in which it is included; an install line operatively interlinking said control unit with each of the plurality of identity controllers; first means for normally applying a signal having a first logic state to said install line, said first means being provided in said control unit; second means for generating a global address signal and for applying the global address signal to each of the identity controllers; third means included in each of said identity controllers for producing a signal having a second logic state and applying it to said install line in a manner which replaces the first logic state with the second logic state when initially connected to said install line; and rourth means included in said control unit which is responsive to the change in the logic state appearing on the install line, for issuing addresses which cover a predetermined maximum number of modems which can be interconnected with the control unit.

A sixth aspect of the present invention comes in a dial-up network terminal, comprising: a control unit; a plurality of sub-controllers assigned to said control unit, each of said sub-controllers having an identity controller dedicated to identifying the sub-controller in which it is included; an install line operatively interlinking said control unit with each of the plurality of identity controllers; first means for normally applying a signal having a first logic state to said install line, said first means being provided in said control unit; second means for generating a global address signal and for applying the global address signal to each of the identity controllers; third means included in each of said identity controllers for producing a signal having a second logic state and applying it to said install line in a manner which replaces the first logic state with the second logic state when initially connected to said install line; and fourth means included in said control unit which is responsive to the change in the logic state appearing on the install line, for issuing addresses which cover a predetermined maximum number of sub-controllers which can be interconnected with the control unit.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of the present invention will be discussed with reference to FIGS. 2 and 3.

Figure 1:
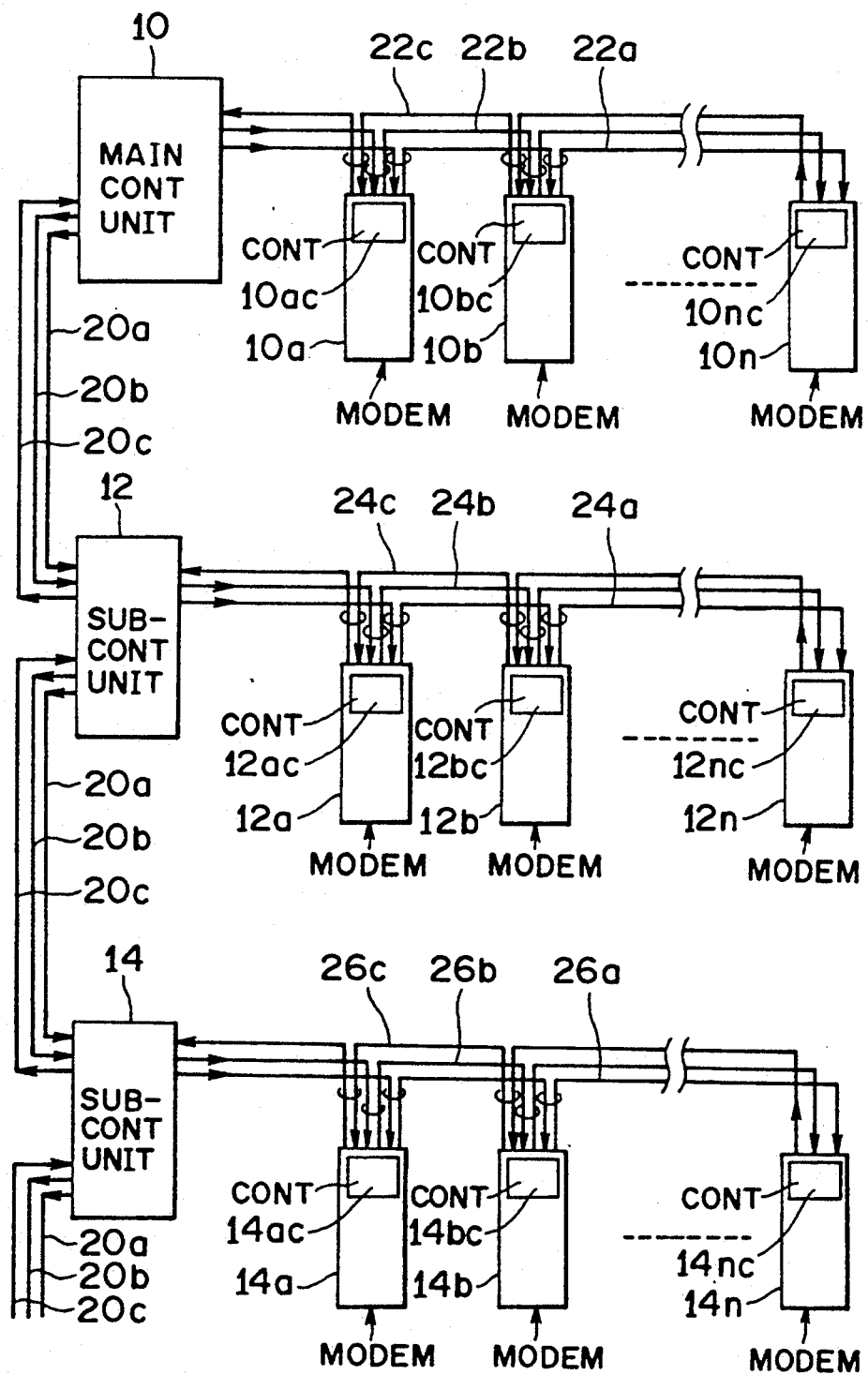
FIG. 1 is a block diagram showing a prior art arrangement for determining a newly installed modem or sub-control unit, referred to in the opening paragraphs.
Figure 2:
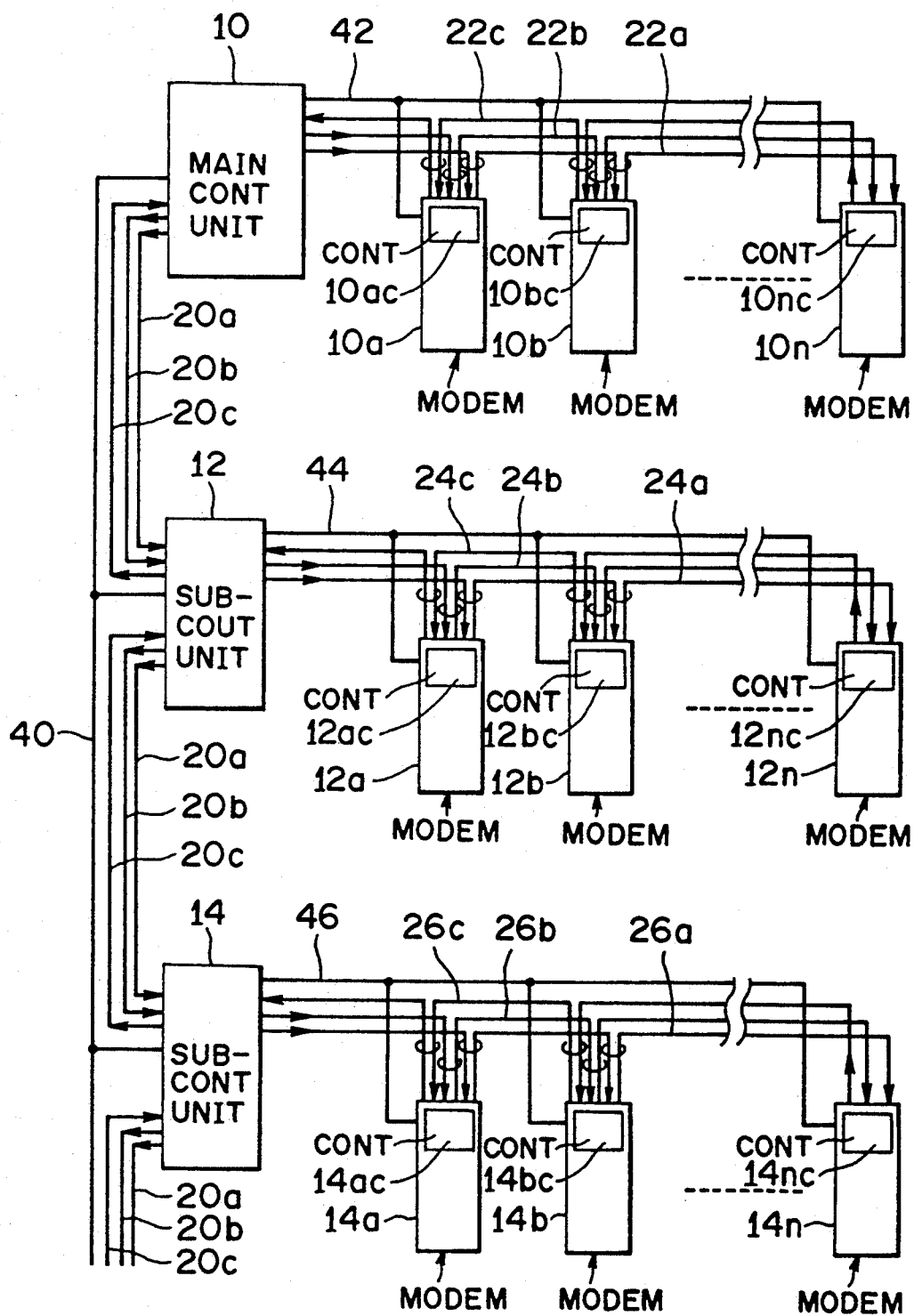
FIG. 2 is a block diagram showing a preferred embodiment of the present invention.

FIG. 2 shows the preferred embodiment in schematic block diagram form. The arrangement of FIG. 2 differs from that shown in FIG. 1 in that the arrangement according to the present invention further comprises install detecting lines 40, 42, 44 and 46.

The main control unit 10 is arranged to identify a newly installed sub-control unit, while each of the sub-controllers 12 and 14 is arranged to detect which modem has been freshly coupled thereto. For brevity only the case where the sub-control unit 12 detects a newly installed modem unit 12b will be discussed.

Figure 3:
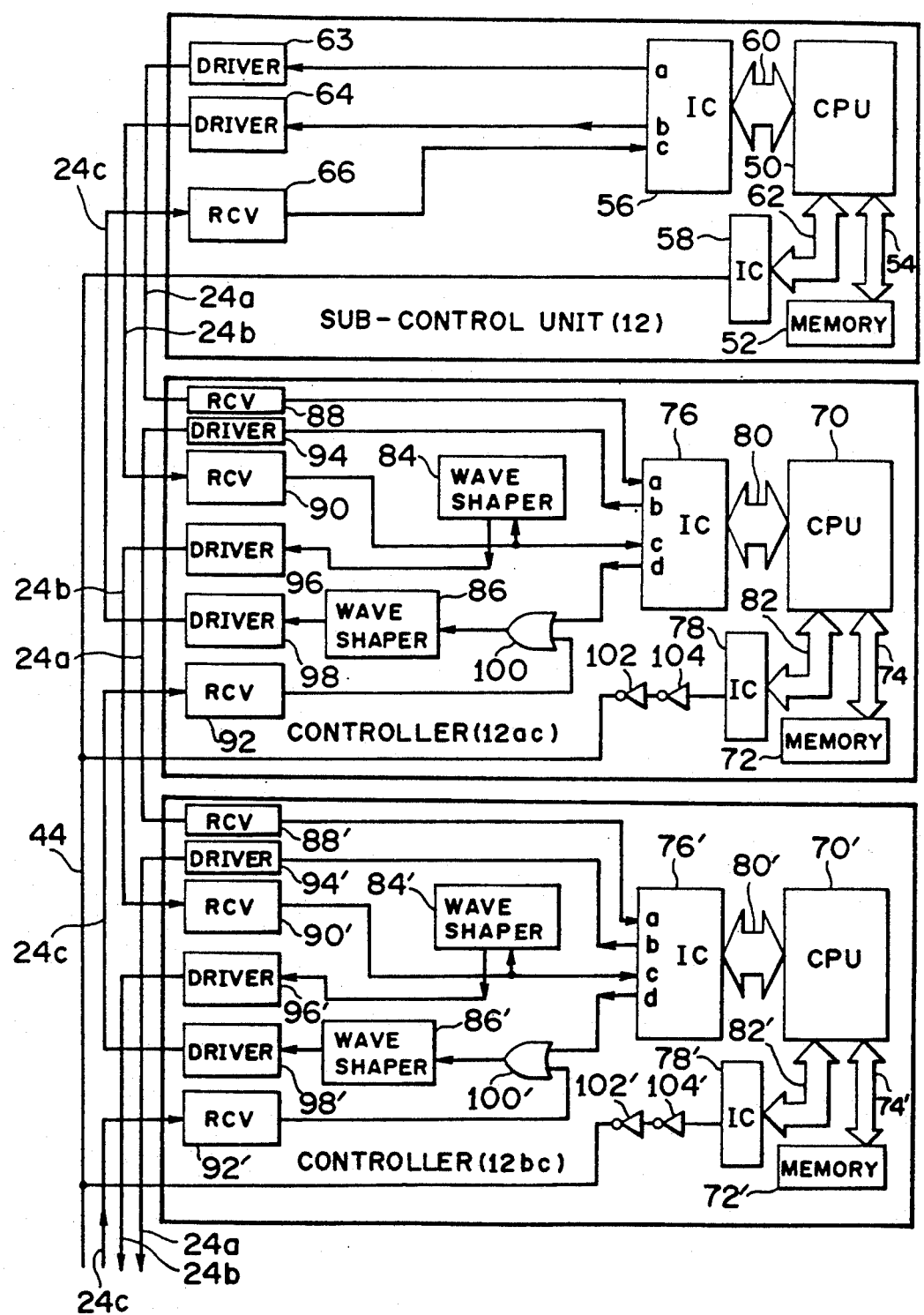
FIG. 3 is a block diagram showing details of selected blocks from the FIG. 2 arrangement.

FIG. 3 shows a sub-control unit 12 together with the two controllers 12ac and 12bc which are repectively included in the modems 12a and 12b. It should be noted that the main portion of each of modems 12a, 12b is omitted in FIG. 3 in that they are not directly related to the present invention.

The sub-control unit 12 includes, in this particular case, a central processing unit (CPU) 50, a memory 52 coupled to the CPU 50 via a bus 54, two integrated circuits (ICs) 56 and 58 which are coupled to the CPU 50 by way of buses 60, 62. The unit 12 further comprises two drivers 63, 64 and a receiver 66.

On the other hand, the controller 12ac which forms part of the modem 12a includes a CPU 70, a memory 72 coupled to the CPU 70 via a bus 74, and two ICs 76 and 78 which are respectively coupled to the CPU 70 through buses 80, 82. The controller 12ac further comprises, two wave shapers 84, 86, three receivers 88, 90 and 92, three drivers 94, 96 and 98, on OR gate 100, and two inverters 102, 104. The inverter 102 takes the form of an open-collector type in order not to be adversely affected by a logic signal appearing on the install detecting line 44.

The arrangement of the controller 12bc is exactly the same as that of the controller 12ac, and as such each of the counterparts of the controller 12bc is denoted by the same reference numeral as the corresponding block by attaching a prime thereto.

The IC 56 produces a timing clock signal at the output "a" thereof, which signal is applied to an input "a" of the IC 76 of the controller 12ac via the driver 63 and the receiver 88. The IC 76 in turn outputs a timing clock signal from the output terminal "b" thereof, which clock signal is applied to an input terminal "a" of the IC 76' which in turn applies a timing clock signal from an output terminal "b" thereof to the next stage (not shown) via the driver 94'. These timing clocks are utilized to synchronize the operations of the blocks in FIG. 3 arrangement. However, the application of the timing clocks to the blocks shown in FIG. 3 is omitted for simplifying the drawing.

The operation of the FIG. 3 arrangement will now be described. It is assumed that the modem 12b is the newly added unit and the modem 12a has already been installed and has already established communication with the sub-controller 12. Accordingly, the sub-controller 12 already contains information indicative of the installation of the modem 12a within its memory 52. When the modem 12b is firstly installed and a power associated therewith is turned on, the CPU 70' allows the IC 78' to generate a low logic level (for example). The logic level on the install detecting line 44 which normally exhibits a high logic level, is changed to the low logic level.

This change of the logic level from "high" to "low" detected by the IC 58 of the sub-controller 12. Thus, the CPU 50 allows the IC 56 to produce, via an output terminal "b", an address signal (viz., polling signal) which is applied to the line 24b through the driver 64. The polling signal sequentially exhibits all the addresses which are assigned to the modems (installed or not yet installed) the maximum number of which is predetermined at the stage of the system design.

The polling signal (viz., address signal) is applied to an input terminal "c" of the IC 76 via the receiver 90. As previously referred to, the controller 12ac has already established communications with the sub-controller 12 and stored such information in the memory 72. Accordingly, the CPU 70 ignores the polling even if receiving the address assigned thereto. The address signal, applied to the controller 12ac, is wave-shaped at the block 84 and then fed to an input terminal "c" of the IC 76' by way of the driver 96 and the receiver 90'. When the CPU 70' of the controller 12bc detects that the address signal (viz., polling signal) indicates the address assigned thereto (viz., the modem 12b), the CPU 76' causes the IC 78' to output a reply signal from the output terminal "d" of the IC 76'. The reply signal passes through the OR gate 100' and is wave-shaped at the block 86' and thereafter applied to an input terminal "c" of the IC 56 of the sub-controller 12 via the blocks 98', 92, 100, 86, 98 and 66 in that order. Accordingly, the CPU 50 identifies or ascertains the installation of the new modem 12b through the use of the controller 12bc thereof, and begins to communicate therewith if necessary.

As described above, the controller 12bc of the newly installed modem 12b renders the logic level on the line 44 when the power thereof is initially turned after the modem 12b is installed. However, the logic level on the line 44 can be changed by an alternative technique. That it to say, it is possible to use a global addressing technique discussed below. The term "global address" in the instant specification implies that it covers all the addresses prepared for the modems which the sub-controller 12 is controllable irrespective of whether the modem is in fact installed or not. In the event that a given modem has already been acknowledged by the sub-controller 12, the modem ignores the global address and hence issues no reply thereto. However, the controller 12cb of the newly installed modem 12b is responsive, in this particular case, to the global address which appears on the line 24b, and allows the IC 78' to produce the above-mentioned low logic level under the control of the CPU 70'. The following steps are the same as previously mentioned.

As shown in FIG. 3, there are provided a plurality of drivers and receivers. However, in the event that the lines extending between the sub-controller 12 and the modem 12a and between the adjacent modems 12a and 12b (for example) are sufficiently short, the drivers and receivers can be omitted together with the wave-shapers 84, 86, 84' and 86' and the other blocks 100, 102, 104, 100', 102' and 104'. It is therefore within the scope of the present invention to omit the above-mentioned blocks.

In the above discussion, the sub-controller 12 identifies the freshly installed modem 12b coupled thereto. However, the present invention is also applicable to the group which includes the sub-control unit 14 and the modems 14a–14n, and also applicable to the main control unit 10 to which a plurality of modems 10a–10n. Still further, the present invention is applicable to the case where a newly installed sub-controller can be identified by the main control unit 10.

While the foregoing description described one preferred embodiement with one variant according to the present invention, the various alternatives and modifications possible without departing from the scope of the present invention, which is limited only by the appended claims, will be apparent to those skilled in the art.

What is claimed is:

1. A method of identifying a first unit which is newly installed and joins a plurality of second units in a networked terminal, each of said second units having previously established a communication link with a control unit and being configured in the same manner as said first unit, each of said first and second units being assigned different addresses by which said units are specified, said first and second units being connected to and managed by said control unit, said method comprising the steps:

(a) outputting by said first unit a first logic state on an install detecting line when said first unit is firstly installed, said install detecting line being connected between said first and second units and said control unit and normally exhibiting a second logic state;

(b) detecting said first logic state on said install detecting line by said control unit;

(c) issuing by said control unit, in response to the detection of said first logic state, a plurality of addresses on a first control line connected between said first and second units and said control unit, said plurality of addresses being equal in number to a predetermined maximum number of units which can be managed by said control unit;

(d) generating by said first unit a reply signal in response to an address assigned thereto received on said first control line, the reply signal being sent to said control unit on a second control line connected between said first and second units and said control unit; and (e) generating by said first unit the second logic state to restore said install detecting line to said second logic state.

2. A method of identifying a first unit which is newly installed and joins a plurality of second units in a networked terminal, each of said second units having previously established a communication link with a control unit and being configured in the same manner as said first unit, each of said first and second units being assigned different addresses by which said units are specified, said first and second units being connected to and managed by said control unit, said method comprising the steps:

(a) intermittently generating by said control unit a global address which is transmitted to said first and second units on a first control line connected between said first and second units and said control unit;

(b) outputting by said first unit, in response to said global address, a first logic state on an install detecting line connected between said first and second units and said control unit and which normally exhibits a second logic state, said second units each ignoring said global address;

(c) detecting said first logic state on said install detecting line by said control unit;

(d) issuing by said control unit, in response to the detection of said first logic state, a plurality of addresses on said first control line, said plurality of addresses being equal to a predetermined maximum number of units which can be managed by said control units;

(e) generating by said first unit a reply signal in response to an address assigned thereto received on said first control line, the reply signal being sent to said control unit on a second control line connected between said first and second units and said control unit; and (f) generating by said first unit the second logic state to restore said install detecting line to said second logic state.

3. A dial-up network terminal comprising:

a control unit, said control unit being capable of controlling a predetermined maximum number of modems;

a plurality of modems less than or equal to said predetermined maximum number connected to and managed by said control unit, each of said modems having an identity controller dedicated to identifying the modem in which it is included;

an install line operatively interlinking said control unit with each of the identify controllers of said plurality of modems;

first means for normally applying a signal having a first logic state to said install line, said first means being provided in said control unit;

second means included in each of said identity controllers for producing a signal having a second logic state and applying it to said install line in a manner which replaces the first logic state with the second logic state when the identity controller is initially connected to said install line; and third means included in said control unit which is responsive to the change in the logic state appearing on the install line for issuing a plurality of addresses on a control line connected between said plurality of modems and said control unit, said plurality of addresses being equal in number to said predetermined maximum number.

4. A dial-up network terminal comprising:

a control unit, said control unit being capable of controlling a predetermined maximum number of sub-controllers;

a plurality of sub-controllers less than or equal to said predetermined maximum number connected to and managed by said control unit, each of said sub-controllers having an identity controller dedicated to identifying the sub-controller in which it is included;

an install line operatively interlinking said control unit with each of the identity controllers of said plurality of sub-controllers;

first means for normally applying a signal having a first logic state to said install line, said first means being provided in said control unit;

second means included in each of said identity controllers for producing a signal having a second logic state and applying it to said install line in a manner which replaces the first logic state with the second logic state when the identity controller is initially connected to said install line; and third means included in said control unit which is responsive to the change in the logic state appearing on the install line for issuing a plurality of addresses on a control line connected between said plurality of sub-controllers and said control unit, said plurality of addresses being equal in number to said predetermined maximum number.

5. A dial-up network terminal comprising:

a control unit, said control unit being capable of controlling a predetermined maximum number of modems;

a plurality of modems less than or equal to said predetermined maximum number connected to and managed by said control unit, each of said modems having an identity controller dedicated to identifying the modem in which it is included;

an install line operatively interlinking said control unit with each of the identify controllers of said plurality of modems;

first means for normally applying a signal having a first logic state to said install line, said first means being provided in said control unit;

second means in said control unit for generating a global address signal and for applying the global address signal to a control line connected between said control unit and each of the identity controllers;

third means included in each of said identity controllers and responsive to said global address signal for producing a signal having a second logic state and applying it to said install line in a manner which replaces the first logic state with the second logic state; and fourth means included in said control unit which is responsive to the change in the logic state appearing on the install line for issuing a plurality of adresses on said control line, said plurality of adresses being equal to said predetermined maximum number.

6. A dial-up network terminal comprising:

a control unit, said control unit being capable of controlling a predetermined maximum number of sub-controllers;

a plurality of sub-controllers less than or equal to said predetermined maximum number connected to and managed by said control unit, each of said sub-controllers having an identity controller dedicated to identifying the sub-controller in which it is included;

an install line operatively interlinking said control unit with each of the identity controllers of said plurality of sub-controllers;

first means for normally applying a signal having a first logic state to said install line, said first means being provided in said control unit;

second means in said control unit for generating a global address signal and for applying the global address signal to a control line connected between the control unit and each of the identity controllers;

third means included in each of said identity controllers and responsive to said global address signal for producing a signal having a second logic state and applying it to said install line in a manner which replaces the first logic state with the second logic state; and fourth means included in said control unit which is responsive to the change in the logic state appearing on the install line for issuing a plurality of adresses on said control line, said plurality of adresses being equal to said predetermined maximum number.

* * * * *